United States Patent Office

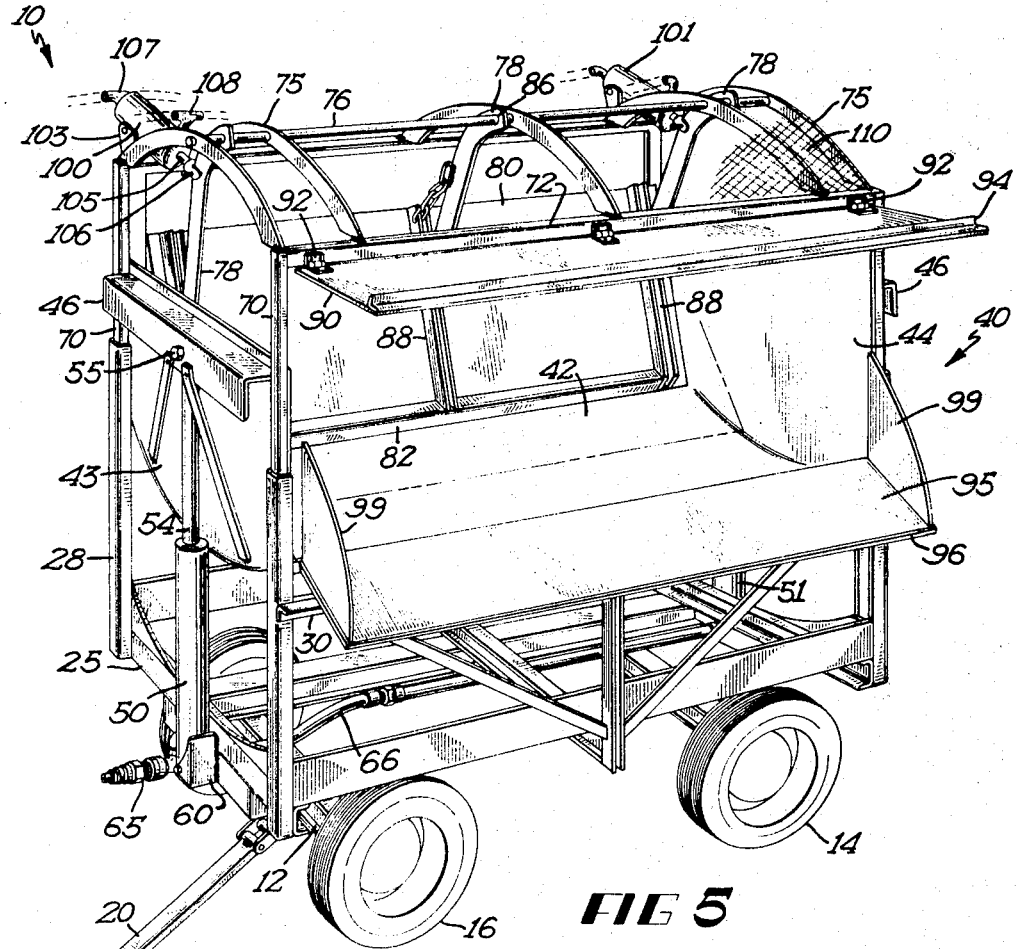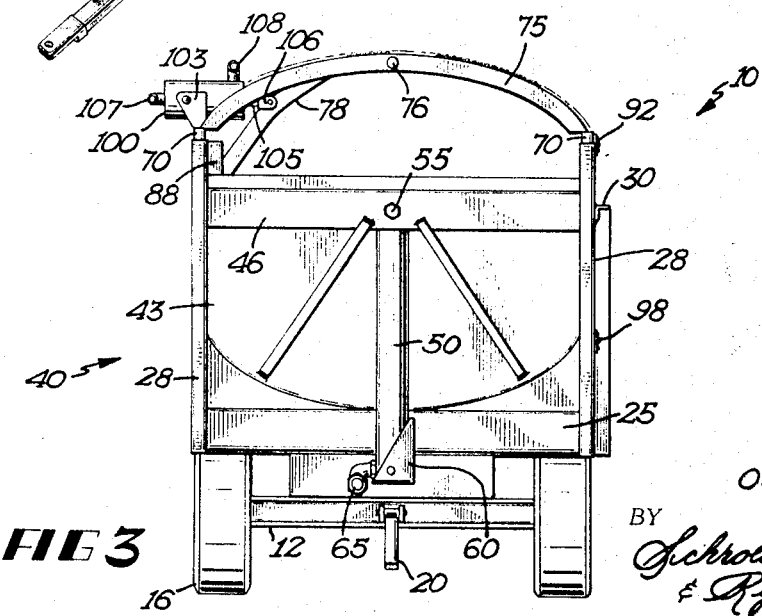

3,450,284
Patented June 17, 1969

3,450,284
TOTALLY EVACUATING FORAGE WAGON
Oskar Diem, Richardton, N. Dak. 58652
Filed Oct. 19, 1967, Ser. No. 676,417
Int. Cl. B60p 1/00
U.S. Cl. 214—514                                 8 Claims

ABSTRACT OF THE DISCLOSURE

The evacuating forage wagon of the present disclosure includes a bin structure mounted on a carriage frame and supported upon a wagon chassis with the bin structure being elevatable on the carriage frame to raise the same for evacuation of material therefrom. The bin structure includes solid end walls and a curved bottom wall with one sidewall being movable across the bottom of the bin and between the ends thereof in the evacuation process. The opposite side wall includes a pair of hinged doors which will normally be held in closed position except when the bin is elevated in the carriage frame.

---

This invention relates to evacuating or dump wagons particularly adapted for use with agricultural equipment and more particularly to a totally evacuating forage wagon adapted to receive forage from a piece of harvesting equipment and to elevate and totally evacuate the forage into a truck for disposal purposes.

Evacuating or dump wagons, particularly adapted for agricultural-type usage, are known and in use. My prior patent, No. 3,205,011 dated Sept. 7, 1965, discloses one version of this type of structure. The complexity in the design of such structures, the instability resulting from elevating a complete bin and the difficulty in evacuating completely such a bin limits the application and load-carrying capacity of such structures. In addition, the expense involved with long-stroke actuators for the same presents another disadvantage from the standpoint of a simplified all-purpose dumping wagon.

The present invention is directed to an improved or totally evacuating forage wagon which has a significantly larger carrying capacity, may be readily used with other agricultural equipment, and will totally evacuate into a truck associated therewith at any desired elevation with assured stability. This improved, totally evacuating forage wagon incorporates a bin structure mounted on a chassis frame through a carriage in which the bin structure is elevatable in a vertical direction for any desired height and in which one sidewall is movable toward the other to evacuate material or forage in the wagon as the opposite sidewall opens to allow egress therefrom.

Therefore, it is the principal object of this invention to provide a totally evacuating forage wagon.

Another object of this invention is to provide an evacuating forage or dump wagon particularly adaptable for use with agricultural equipment which eliminates the requirement of tilting of a bin structure to add greater capacity and stability to the forage wagon.

Another object of this invention is to provide in a wagon of this type a structure which is adjustable to varying heights of trucks.

A still further object of this invention is to provide a forage wagon of this type which is simple in design, easy to use and economical to manufacture.

Another object of this invention is to provide a totally evacuating forage wagon in which one sidewall opens in response to evacuation of the load and the second sidewall is movable to cause evacuation of the load.

Figure 1:
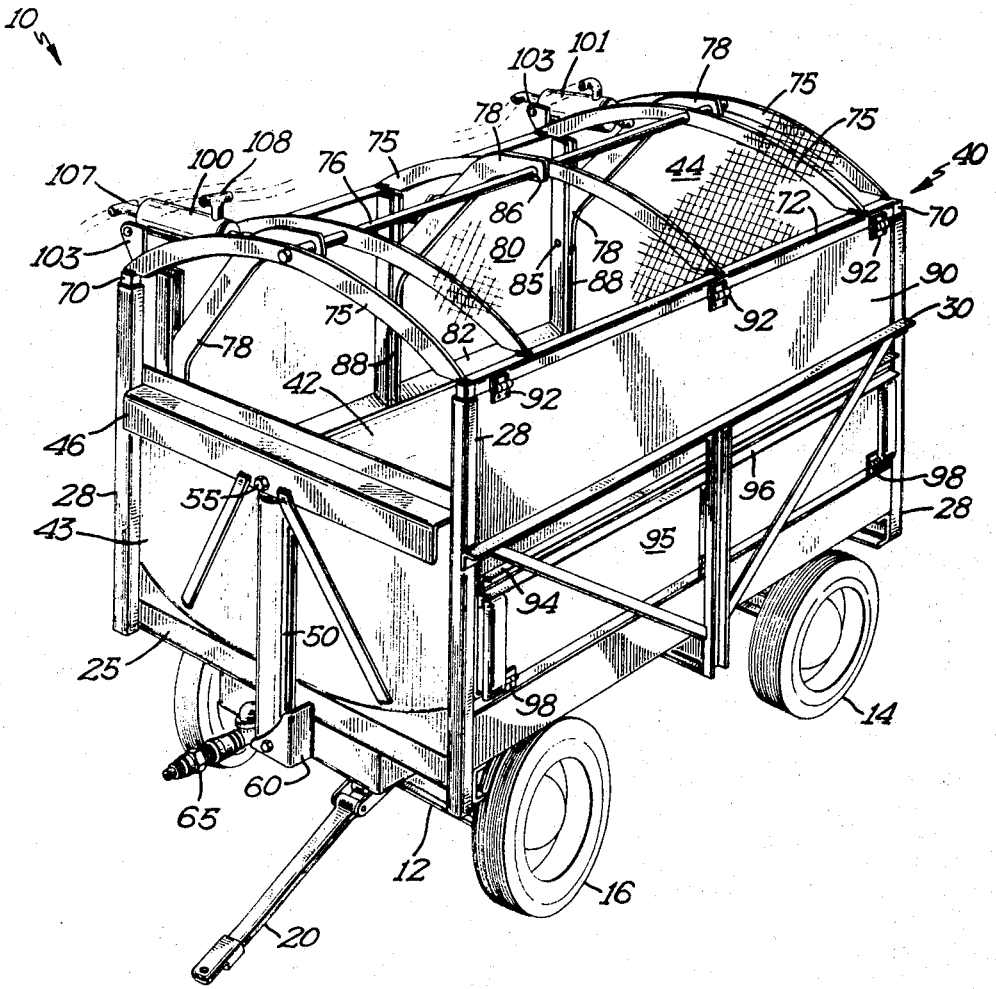
Figure 2:
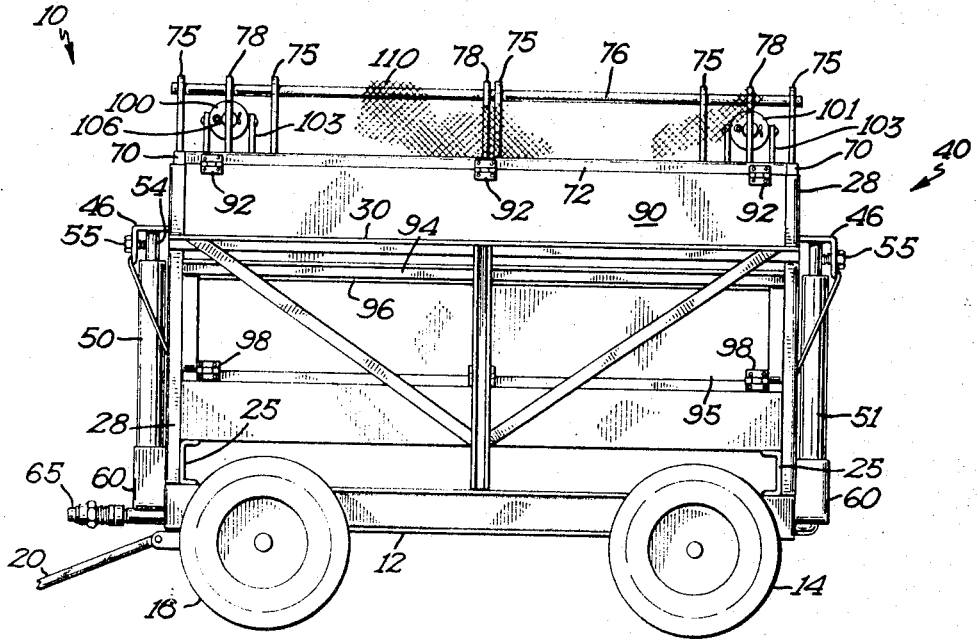
Figure 4:
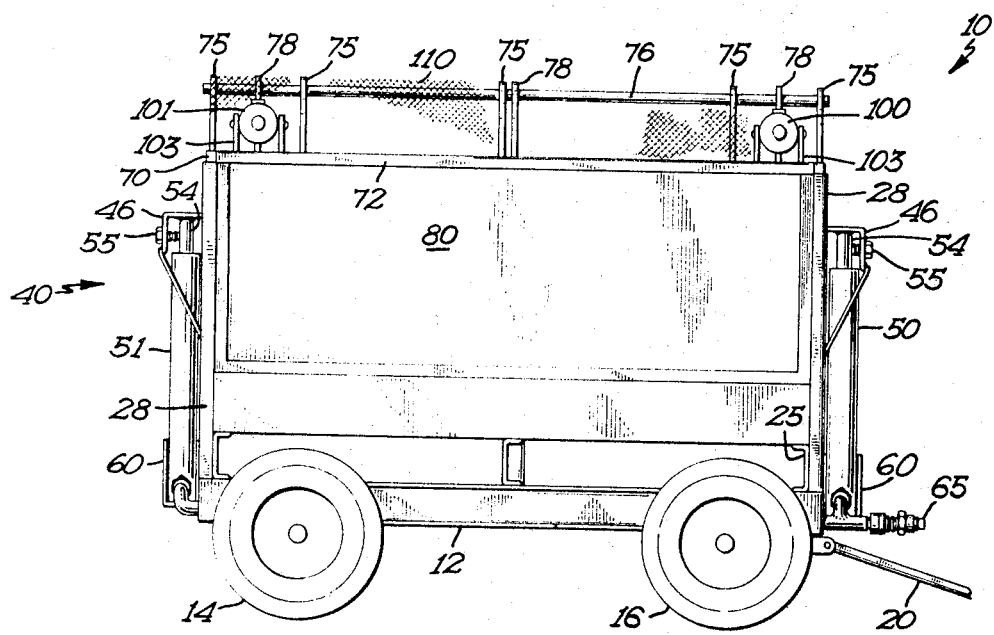

These and other objects of this invention will become apparent from a reading of the attached description together with the drawings wherein:

FIGURE 1 is a perspective view of the improved totally evacuating forage wagon in a closed or load-carrying position, FIGURE 2 is a right-side elevational view of the improved totally evacuating forage wagon, FIGURE 3 is a front end elevational view of the totally evacuating forage wagon, FIGURE 4 is a left-side elevational view of the totally evacuating forage wagon, and FIGURE 5 is a perspective view of the totally evacuating forage wagon of FIGURE 1 in a raised and evacuating position.

My improved totally evacuating forage wagon is shown in the drawings generally at 10. It is comprised basically of a chassis of the conventional type, indicated at 12, having fixed wheels 14 on one end of the same and steerable wheels 16 on the opposite end with a draw tongue or bar 20 pivotally connected thereto in a conventional manner. The chassis mounts a carriage frame 25 having a plurality of upright sections or support members 28 secured thereto and transversely extending side brace structures 30, these parts being formed together by conventional means such as welding. Positioned within the carriage frame, defined by the upright support members, which are U-shaped or channel-shaped in cross section, and the side brace or frame portion 30 is a bin structure, indicated generally at 40. The bin structure includes a curved arcuate bottom portion 42 and end walls 43 and 44 which are connected to the bottom portion through suitable means such as welding. The front end wall 43 includes a channel member 46 on the upper edge of the same and does not extend the full or same height as the back wall 44. A similar channel member 46 is included on the back wall 44 intermediate its height and these channel members serve to connect the hydraulic actuators 50 and 51 for raising the bin structure. Each of the hydraulic actuators include an operating shaft 54 which connects to the respective flange members through a bolt-type connector 55 and the cylinder portion of the actuator is connected through a bracket-type support 60 mounted on the carriage frame which serves as the support for the conduit connected to the inlet port to the evacuator. A suitable fluid connection 65 connects to the inlet conduit and an interconnecting pipe 66 extends across the bottom of the carriage frame and connects to the opposite actuator 51 at the back end of the wagon in the same manner. These actuators are of the ram-type having a single port and may include a suitable equalizer valve (not shown) to insure simultaneous and proper movement of the output shafts to elevate the bin structure from both ends simultaneously and to support the load equally.

The bin structure 40 has rod-type frame members attached at the edges of the end walls 43, 44 as indicated at 70. These frame members being generally rectangular in cross section and fit into the channel-shaped upstanding supports 28 of the carriage frame in a telescopic fashion to be guided therein as the bin structure is elevated through the actuators 50, 51. Attached to the frame members are transversely extending members 72 at the upper ends of the same, and arcuate, flat top support members 75 extending between the members which carry a rod 76 midway at the top of the bin structure. This rod will support pivoted arms 78 which carry or mount one sidewall 80 of the bin structure. The sidewall 80 is generally rectangular in form with reinforced framework 82 thereon which pivotally mounts one end of the arms 78 midway along the extent of the door, as indicated at 85. The sidewall 80 includes slots 88 at the framework 82 sufficient to allow passage of the arms 78 therein as the door is pivoted. The free extremities of the arms 78 are journalled or pivotally mounted on the shaft 76, as is indicated at 86. As indicated in the drawings, three such arms support the sidewall 80 to pivot the same about the axis of the shaft 76. The pivotal connection of the arms at the sidewall 80 is midway along the side of the same which will allow the sidewall to move in an arcuate fashion following the curved contour 42 of the bottom of the bin structure for the purpose of ejecting a load from the forage wagon. The movement will be in the direction of the opposite sidewall which is formed by two pivoted door members 90 and 95, the upper door member 90 being hinged on the transversely extending frame member 72 of the upstanding frame portion of the bin structure as indicated at 92. The unpivoted edge of the upper frame part 90 of the sidewall has a lip 94 thereon which will be later noted co-acts with the similar lip on the lower sidewall or door. The latter is pivoted at its lower edge, as indicated through hinges 98, which will allow the door to pivot downwardly and suitable flange portions 99 thereon cooperate with the door to form a chute for guiding material being evacuated from the forage wagon. The free edge of the door or wall portion 92 has a lip 96 which in a closed position will overlie the lip 94 of the door section 90 to hold the same in a closed position.

The sidewall formed by the door portions 90, 95 are each freely movable independent of one another through their respective hinges and in the elevated position of the bin structure, as will be hereinafter noted, will be free to move under the influence of gravity and the force of a load in the bin structure to open and allow the load to be evacuated. The opposite sidewall 80, which is a single rectangular shape or structure carried by the arms 78, will be moved under the influence of hydraulic actuators, indicated at 100 and 101. The cylinder portion of the actuators are mounted on upstanding flanges 103 attached to the frame portion 72 of the bin structure and the operating shafts 105 are connected to the pivoted arms 78 through a pivotal connection, such as indicated at 106, to move the arms in an arcuate manner and hence the door toward the opposite sidewall section. The cylinder portions in their mounting on the flanges 103 are pivotally mounted to be free to follow the arcuate movement of the arms 78 as the sidewall section 80 is moved across the bottom surface of the bin structure and between the end walls 43, 44. The actuators 100, 101 are bidirectional and suitable hose connections 107 and 108 are connected in parallel to the opposite extremities of the respective cylinder portions of the actuators 100, 101 to provide the source and return lines for the actuators for the bidirectional movement causing the arms 78 to pivot above the axis of the shaft or support rod 76 for the sidewall.

In use, my improved totally evacuating forage wagon will normally be drawn with and positioned adjacent a piece of harvesting equipment, such that it may receive forage therefrom. Under normal circumstances, a screen, such as is indicated in phantom at 110, will be placed across the top of the wagon and suitably attached to the curved brace members 75 of the bin structure to prevent excess blowing of dust from the wagon. The discharge from the harvesting equipment into the wagon will take place at the front end thereof over the top of the front wall 43. The bin structure will be positioned in its lowest position on the carriage frame with the support rods 70 therefor telescopically fitting into the upstanding supports 28 of the carriage frame. In this position, the doors and side panels 90 and 95 forming one sidewall will be lowered or be positioned below the cross or horizontal brace 30 such that the lower door will be restrained from pivoting downward and the upper door or section 90 will be retained in its position due to the interaction of the lips 96, 94 of the door sections for this sidewall. Similarly, the sidewall panel 80 will be positioned against the cooperating horizontal brace structure 30 defining the limits of the movement of the wall in this direction. The wagon will be in a position shown in the perspective view of FIGURE 1 for loading and transport purposes.

Whenever it is desired to evacuate the wagon after loading, the hydraulic circuitry associated therewith will be so operated as to provide pressure through the inlet ports or conduits 65 for the rams 50 and 51 which will raise the bin structure in the carriage frame to an elevated position. Suitable valving will allow the load to be totally supported by these actuators in the carriage frame. The load so elevated will still be located between the wheels on the chassis frame so as to retain stability for the forage wagon. Depending upon the height of the truck box into which the load is to be evacuated, the actuators may be raised to their full extent and if desired, suitable shims (not shown) or spacers may be included between the ends of the actuator shaft of the actuators 50 and 51 and the flange sections 46 on the end walls 43, 44 to which they are attached to raise or adjust the ultimate height of the wagon. After the wagon has been elevated to its maximum or desired height, the pressure of the load will normally open the doors or panel sections 90, 95 for the sidewall from which the discharge is to take place. Once the bin structure has been elevated above the horizontal brace 30, the lower panel or side section 95 is free to rotate under the force of gravity and its flange sections 99 will form a discharge chute therewith to discharge the contents of the wagon adjacent this sidewall into a loading vehicle. The force of the material will also raise the sidewall portion 90 which is freely pivotal thereon. To completely evacuate the wagon, the hydraulic actuators 100, 101 will be energized in such a direction that the shafts 105 thereof will extend forcing the arms 78 mounting the sidewall panel or section 80 in an arcuate direction across the bottom of the bin structure. This movement will be in an arcuate or circular path and the sidewall section will traverse the curved or bottom surface of the bin structure moving the material ahead of the same. As the sidewall section approaches the oposite wall or the panel sections 90, 95 standing open, the curved arms 78 supporting the same and pivoting relative to the panel section 80 will pass through the slots 88 thereof. The sidewall section which, in its normal position, will be slightly inwardly tapered or tilted will now move over center as the edge of the bottom portion of the bin structure is approached and portions of the panel section or wall section 95 of the opposite wall are engaged. This movement will cause pivoting of the wall section 80 in an over-center direction from a position in which the bottom edge thereof was inwardly inclined toward the bin structure to a position where the top edge is inclined in the opposite direction making an angle of approximately 30 degrees to the vertical and with the upper edge of the panel section 80 extending outwardly into the chute area defined by the wall section 95. This movement will take place rapidly to eject the remaining portion of the load placing the same on the chute which will be downwardly inclined to cause free fall thereof into the wagon or truck adapted to receive the same. The movement of the sidewall across the bottom of the bin structure and with a final kick or overcenter movement thereof as its extreme of travel is reached will totally eject or evacuate the forage or material contained in the wagon. Once the wall or panel section 80 has reached its extreme of movement and the load ejected, the bin structure may be returned to its original position. By reversing the position of controls at the fluid source, flow through the conduits 107, 108 will be reversed causing the actuator 100, 101 to reverse their direction of movement and pivot the arms 78 in the opposite direction. This will bring the panel or sidewall section back to its original position of location. In this position, the force of gravity will have caused the panel section 90 to return to its original position and downward movement of the entire bin structure with release of pressure on the actuators 50, 51 will swing the lower panel section 95 up to its original position locking or latching the upper side panel section 90 therewith. Once the entire bin structure is within the confines of the horizontal braces 30 as it is lowered, the side sections will remain in position and the wagon will be ready to receive another load or for transport purposes in an evacuated condition.

This improved bin structure with the movable sidewalls for evacuation purposes permits an increased load-carrying capacity with a provision for total evacuation automatically through the operation of the actuators. In addition, the structure will remain stable at all times in a loaded and unloading condition, since the weight will be centered within the confines of the chassis which will prevent instability thereof. In addition, the improved wagon can be made relatively narrow in width since a wide base is not necessary because of the load positioning thereon. The improved totally evacuating forage wagon may be adjusted or made to reach any desired height within the physical limits or size of the structure and in that position will accommodate trucks having slightly varying heights. The structure permits mounting of a screen across the top of the same to avoid blow or dust from the discharge of a harvester to the forage wagon to improve the use of such structure. The totally evacuating forage wagon of the present invention is simple in design and utilizes conventional components, such that it may be readily and easily used, manufactured and maintained.

Therefore, in considering this invention, it should be remembered that the present disclosure is intended to be illustrative only and the scope of the invention should be determined by the appended claims.

What is claimed is:

1. An evacuating forage wagon comprising, a steerable wheeled chassis, a carriage frame mounted on the chassis and supported thereby, said carriage frame having a plurality of upright support members therein, a bin structure carried on said carriage frame and including a bottom and two end walls formed integral with one another and a pair of movable sidewalls, means slidably mounting the bin structure on the upright support members of the carriage frame, and actuator means mounted in part on the carriage frame and connected respectively to the bin structure and one of said movable sidewalls to elevate the bin structure on the carriage frame and move said one of the sidewalls, said one of said sidewalls of the bin structure being an integral unit pivotally mounted on the bin structure and movable toward the other of said sidewalls to evacuate the forage wagon, the other of said sidewalls of the bin structure being comprised of two vertically spaced portions pivotally mounted on the bin structure with the lower portion being movable from a closed to an open position in response to elevation of the bin structure and the force of the load within the bin structure through movement of said one of the sidewalls whenever the forage wagon is filled to open said portions of the other of said sidewalls and permit exit of material to be evacuated from the forage wagon.

2. An evacuating forage wagon comprising, a steerable wheeled chassis, a carriage frame mounted on the chassis and supported thereby, said carriage frame having a plurality of upright support members therein, a bin structure carried on said carriage frame and including a bottom and two end walls formed integral with one another and a pair of movable sidewalls, one of said sidewalls of the bin structure being an integral unit pivotally mounted on the bin structure and movable toward the other of the sidewalls, means slidably mounting the bin structure on the upright support members of the carriage frame, first actuator means including at least two actuators positioned on the carriage frame and connected respectively to the bin structure at the end wall portions of the same for moving the bin structure slidably on the plurality of upstanding support members normal to the extent of the chassis in the carriage frame, and second actuator means including separate actuators connected in part to the bin structure and in part to said one of said sidewalls near the extremities of the same for pivoting said one of said sidewalls relative to the bottom and end walls of the bin structure and toward the other of the sidewalls to evacuate the forage wagon, said other of said sidewalls of the bin structure being comprised of portions pivotally mounted on the bin structure and movable in response to elevation of the bin structure and movement of said one of said sidewalls whenever the forage wagon is filled to permit exit of the material to be evacuated from the forage wagon, said bin structure having a curved arcuate bottom and said one of said sidewalls being mounted through a pair of arms which in turn are pivoted on the bin structure to move said one of said sidewalls in an arcuate path parallel to the curved bottom.

3. The evacuating forage wagon of claim 2 in which the other of said sidewalls is comprised of a pair of pivoted portions, the lower portion of which has transversely extending flanges on the ends thereof to form a chute in a position pivoted away from the bin structure for evacuating forage from said wagon.

4. The evacuating forage wagon of claim 3 in which the carriage frame includes at least two horizontal side bars extending between the upright members to restrict movement of the other of said sidewalls until said bin structure is elevated on said upright support members to a predetermined position.

5. The evacuating forage wagon of claim 4 in which the bin structure includes frame parts along the sidewalls upon which said other of said sidewalls are pivoted and including a centrally located frame pivotally mounting the arms to which said one of said sidewalls is connected for movement.

6. The evacuating forage wagon of claim 5 in which said one of said sidewalls includes slots corresponding with said arms to permit the arms to move through said one of said sidewalls as said actuators are operated to tilt said one of said sidewalls in addition to pivoting the same for evacuation of the forage wagon.

7. The evacuating forage wagon of claim 6 in which the other of said sidewalls including the two pivoted portions have cooperating flanges whereby the lower portion will retain the upper portion of the other of said sidewalls in a closed position until after the bin structure has been elevated to a predetermined height above the horizontal side bars.

8. An evacuating forage wagon comprising, a steerable wheeled chassis, a carriage frame mounted on the chassis and supported thereby, said carriage frame having a plurality of upright support members therein, a bin structure slidably mounted on the carriage frame and adapted to be elevated from the chassis, said bin structure including bottom and end walls formed integral with one another and a pair of movable sidewalls, means mounting one of said sidewalls for pivotal movement across the bottom wall and toward the other sidewall, first actuator means connected between the carriage frame and the bin structure for elevating the bin structure through slidable movement in the upright support members, second actuator means connected between the bin structure and the pivotal mounting means for said one of said movable sidewalls to move said one of said movable sidewalls across the bottom wall of the bin structure, and means pivotally mounting the other movable sidewall on the bin structure to be movable in response to elevation of the bin structure and the force of the load within the bin structure with movement of said one of said movable sidewalls to evacuate the forage wagon.

References Cited

UNITED STATES PATENTS

| | | | |
|---|---|---|---|
| 1,293,239 | 2/1919 | Strauss | 214—82 |
| 2,284,661 | 6/1942 | Joy | 214—82 |
| 3,229,829 | 1/1966 | Weatherbee | 214—82 XR |

FOREIGN PATENTS 462,789   4/1951   Italy.

ALBERT J. MAKAY, Primary Examiner.

U.S. Cl. X.R.

214—82, 518